United States Patent [19]

Miller

[11] 3,958,494

[45] May 25, 1976

[54] MULTIPLE DISPLACEMENT HYDRAULIC MOTOR DRIVE APPARATUS

[75] Inventor: Franklin G. Miller, Orchard Park, N.Y.

[73] Assignee: Moog Inc., East Aurora, N.Y.

[22] Filed: Sept. 30, 1974

[21] Appl. No.: 510,802

[52] U.S. Cl. .................. 91/411 A; 91/412; 173/2; 408/9; 90/11 R

[51] Int. Cl.² .................. F15B 11/00; F15B 13/00; B23B 39/08

[58] Field of Search .................. 60/483, 484, 420; 90/11, 14; 408/239, 124, 9; 91/411 R, 411 A, 412; 192/45

[56] References Cited

UNITED STATES PATENTS

| | | | |
|---|---|---|---|
| 2,616,259 | 11/1952 | Quintilian | 91/411 X |
| 2,658,343 | 11/1953 | McGill | 60/483 X |
| 3,194,368 | 7/1965 | Benson et al. | 192/45 |
| 3,803,981 | 4/1974 | Allgeyer | 90/11 X |
| 3,874,809 | 4/1975 | Hahn et al. | 408/9 X |

*Primary Examiner*—Samuel Scott
*Assistant Examiner*—Parshotam S. Lall
*Attorney, Agent, or Firm*—Sommer & Sommer

[57] ABSTRACT

A rotary power drive is provided for delivering a substantially constant horsepower over a wide speed range in one direction of rotation comprising two or more constant displacement hydraulic motive means operatively associated with a shaft to be driven thereby, an overrunning clutch operatively interposed between at least one of such motive means and said shaft, and means for supplying hydraulic drive fluid to such motive means in different combinations over different shaft speed ranges to provide a multiple displacement hydraulic motor drive apparatus.

5 Claims, 7 Drawing Figures

SINGLE DISPLACEMENT MOTOR – SERVOVALVE COMBINATION (PRIOR ART)

MULTIPLE DISPLACEMENT MOTOR DRIVE APPARATUS

MULTIPLE DISPLACEMENT HYDRAULIC MOTOR DRIVE APPARATUS

BACKGROUND OF THE INVENTION

1. Field of the Invention

The present invention relates to the field of hydraulic motors, and more particularly to a hydraulic motor drive apparatus capable of driving its rotary output shaft with a substantially constant horsepower over a wide speed range in one direction of shaft rotation.

Many machines require a rotary power drive that is capable of delivering substantially constant horsepower over a wide speed range. Such applications include metal cutting machine tools, for example, mills, drills, lathes, and so on; conveyor drives; material mixing drives; and others. The prime mover in these applications is generally an electric motor that runs at a near constant speed and is capable of delivering a maximum horsepower output. The desired load drive speed, however, can vary widely. In such applications it is desirable to provide a wide speed range, together with high efficiency so that the power output of the prime mover can be delivered to the load throughout the speed range.

For example, optimum metal removal in a milling machine will occur throughout a wide speed range, considering the machining of various metals and alloys, differing tool sizes and feed rates, and different tool types such as carbon steel, tungsten carbide, or other. Likewise, different machining operations, such as milling, drilling, reaming, and so on, require different speeds for optimum metal removal.

It is also evident that the capacity of a machine tool to do work will be related to the horsepower delivered to the cutting tool throughout the speed range demanded by optimum metal cutting considerations.

2. Description of the Prior Art

Conventional means for accomplishing substantially constant rotary power transmission over a wide speed range include: (1) a mechanical gear box with drive gear selection, (2) a multi-sheave belt drive, (3) a valve controlled hydraulic motor drive, and (4) a hydrostatic drive. Also, various combinations of these basic techniques have been used, such as hydrostatic drive plus mechanical gear selection.

Techniques (1) and (2) above generally suffer from the lack of continuous variable drive ratio selection. Split-sheave belt drives are an exception but these drives are generally slow in changing drive ratio, and are unwieldy in packaging for many applications.

Techniques (3) and (4) above offer continuous speed ratio change through use of a valve or other hydraulic control device such as a stroking device. Furthermore, either of these techniques lends itself to velocity control by use in a closed servo loop including a servovalve and an output drive speed sensor, such as a tachometer, for velocity feedback.

However, the disadvantage of a servovalve controlled hydraulic motor, technique (3) above, is that it involves severe inefficiency when operated over a wide speed range. This is due to the pressure drop across the servovalve associated with throttling the pump flow. This will be discussed more fully later herein. Various hydraulic pumping arrangements are used to reduce this inefficiency, such as variable displacement pumps, fixed displacement pump unloading circuits, accumulator discharge circuits, and others.

As to the hydrostatic drive, technique (4) above, it achieves excellent power efficiency as pump pressure builds to just what is necessary to move the load over and above the inefficiency of the drive components. However, a hydrostatic drive suffers from lack of drive stiffness whenever the hydraulic motor is located remote from the hydraulic pump. This is due to hydraulic compliance in the conduits for handling hydraulic drive fluid between the pump and motor. In applications, such as for the spindle drive of a milling machine, it is not convenient to mount the hydraulic pump and its driving electric motor close to the hydraulic spindle drive motor, as this would place all drive components on the head of the machine.

Another disadvantage of hydrostatic drives is that a single combination of pump and motor is required for each drive function. Thus in a milling machine, for example, if hydraulic table positioning drives are used, as with servovalves and actuators, and a hydrostatic spindle drive is desired, then a separate hydraulic pump is required for each drive system.

SUMMARY OF THE INVENTION

The present invention overcomes the aforementioned disadvantages of prior art techniques, and provides a hydraulic motor drive apparatus using a plurality of hydraulic motive means, together with overrunning clutches and a selectable hydraulic supply to drive an output shaft in a given rotative direction over a wide speed range with relatively high efficiency.

More specifically, the present invention comprises two or more hydraulic motive means severally of like or different constant displacements for driving an output shaft through overrunning clutch means operatively interposed between said shaft and at least one of said motive means, and means for controlling the supply of hydraulic drive fluid to said motive means. By blocking or unblocking such supply to predetermined ones of said motive means as the rotative speed of said shaft passes predetermined levels, a multiple displacement hydraulic motor is provided.

The primary object of such a multiple displacement hydraulic motor drive apparatus is to deliver to its rotary output shaft a substantially constant horsepower over a wide speed range which may vary from near zero to maximum.

Other objects of the present invention are to provide such a multiple displacement hydraulic motor drive apparatus which has the advantages of being electrically commandable, permitting precise and infinitely settable speed control over a wide speed range with reasonably high efficiency, allowing the use of a single control valve such as an electrohydraulic servovalve together with simple flow switching to enable the various hydraulic motive means to be used individually or in any desired combination, providing inherent load sharing by the various hydraulic motive means, permitting the source of hydraulic drive fluid to be remote without introducing fluid line compliance, being compatible with a constant pressure supply which may be used elsewhere for other servodrives, being packaged compactly, having low inertia because of the absence of gearing and only those motive means of desired displacement being coupled to the output shaft, and utilizing standard components which are, therefore, low in cost.

The present invention has particularly advantageous application as a hydraulic motor drive apparatus for driving a machine tool spindle with the usual single direction cutting requirement, enabling the motor to be mounted directly on an axially movable spindle, rather than driving the spindle through a splined shaft, so as to improve stiffness of the drive and reduce power losses and cost; also enabling the motor's output shaft to be hollow so as to house some spindle tool change mechanisms; further enabling additional inertia to be added, if desired, to provide energy storage as, for instance, to reduce tool chatter; and can be arranged to drive the motor in reverse with limited power for withdrawing a tap, for example.

Other objects and advantages of the present invention will be apparent from the following detailed description of a preferred embodiment disclosed in the accompanying drawings.

DESCRIPTION OF THE PREFERRED EMBODIMENT

Figure 1:
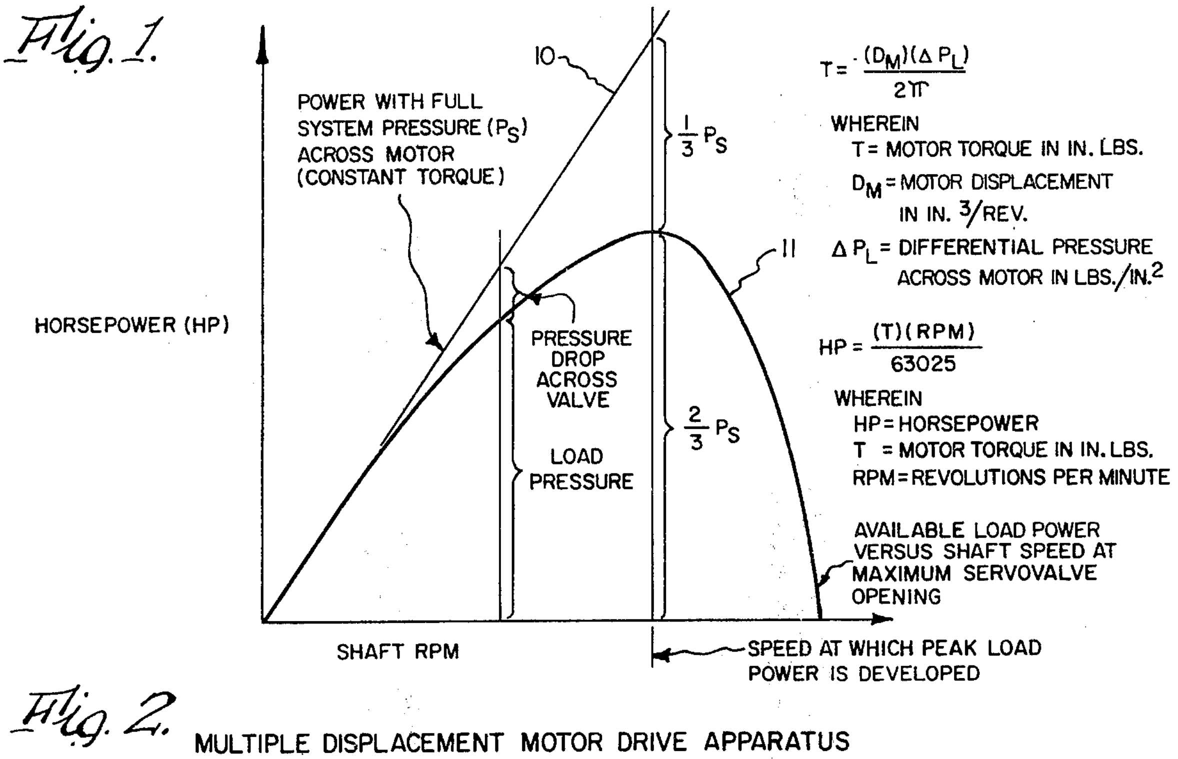
FIG. 1 is a graph plotting power versus output shaft rpm, which is equivalent to flow, for a single displacement hydraulic motor controlled by a servovalve, and portrays the undesirability of using such a prior art combination over a wide speed range because for a required power level at low rpm the motor-valve combination would deliver excess horsepower throughout higher speed ranges.

FIG. 1 represents the performance of the prior art combination of a servovalve regulating the flow of hydraulic drive fluid to a single displacement hydraulic motor having a rotative output shaft. Horsepower, as the ordinate, is plotted against the abscissa of shaft rpm or flow from the hydraulic supply, assumed to be maintained at a constant pressure $P_s$. Since power is equal to torque times speed, a plot of power for constant torque will be proportional to speed. This is depicted by the straight line 10 in FIG. 1 radiating from the origin and represents a constant torque line for a chosen motor displacement when full or maximum system pressure is developed across the motor ports. Falling away from this straight line 10 is a curve 11 representing the available power to the load, or shaft, as the rpm is increased when the motor is controlled by a servovalve. Peak power is transferred to the load when the valve pressure drop is one-third of the available system pressure. Valve sizing will determine at what shaft rpm this will occur. The curve for maximum available power to the load follows the pressure-flow or square-root relationship for the valve orifice at full or 100% valve signal. Deviations from the ideal curves will occur in practice due to hydraulic motor losses, mainly leakage and viscous effects.

Figure 2:
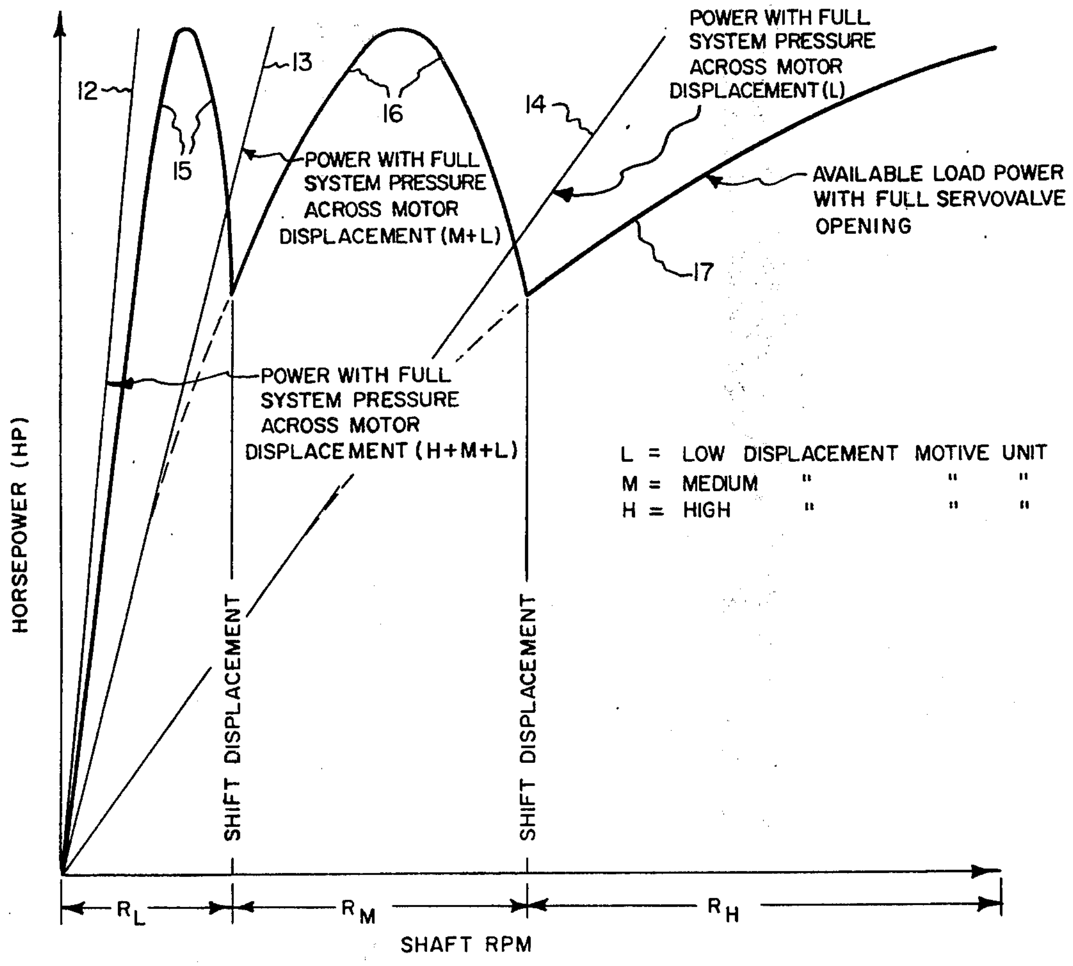
FIG. 2 is a graph plotting power versus output shaft rpm or flow for multiple displacement hydraulic motor drive apparatus embodying the inventive concept, and portrays how substantially constant horsepower is delivered to the output shaft of such apparatus over a wide speed range.

In accordance with the inventive concept, a multiple displacement hydraulic motor drive apparatus will develop constant torque lines of different slopes. This is depicted in FIG. 2 for a three unit hydraulic motor having a high displacement unit H, a medium displacement unit M, and a low displacement unit L. When the displacements of all three units are summed (H+M+L), the hydraulic motor has a steep torque line represented at 12; a flatter torque line represented at 13 when units M and L are summed; and a shallow torque line represented at 14 when only unit L is effective. When units H,M and L are summed and controlled by a servovalve, the available power to the load is represented by the left curve portion 15, effective over a low speed range $R_L$ during which relatively high torque is available. When units M+L are summed and controlled by a servovalve, the available power to load is represented by the intermediate curve portion 16, effective over a mid-speed range $R_M$ during which intermediate torque is available. When only low displacement unit L is supplied with drive fluid from a servovalve, the available power to the load is represented by the right curve portion 17, effective over a high speed range $R_H$ during which relatively low torque is available. Suitable means are provided for shifting the motor displacement when passing from one to another of the speed ranges $R_L$, $R_M$ and $R_H$.

Thus a generally saw tooth pattern of maximum available power to the load is provided, resulting in a substantially constant horsepower delivered to the load over the full speed range which varies from near zero to maximum, the upper limit of speed range $R_H$.

As previously mentioned, the inventive concept is especially suited in application for the hydraulic drive of the spindle of a machine tool where power requirements are unidirectional due to single handed cutting tools, and this has been selected for disclosure in this specification as the best mode of carrying out the present invention.

Figure 3:
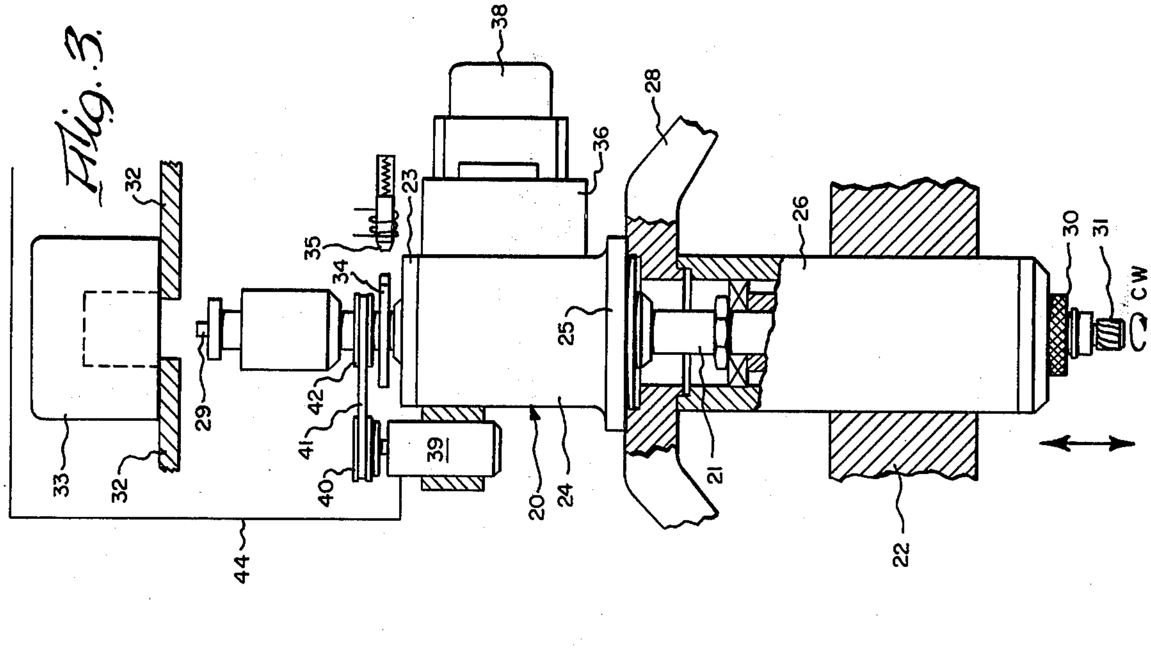
FIG. 3 is a fragmentary vertical side view, partly in elevation and section, of a multiple displacement hydraulic motor drive apparatus constructed in accordance with the principles of the present invention, and showing such apparatus arranged for driving the axially movable vertical spindle of a milling machine and in association with other elements of such a machine tool.

Referring to FIG. 3, there is shown schematically an adaptation of the inventive multiple displacement hydraulic motor 20 to the rotary drive of a vertical spindle 21 of a milling machine, the stationary frame of which is fragmentarily represented at 22. This spindle 21 is shown as extending upwardly through the cover 23 for a cup-shaped motor housing 24 having a lower end wall 25 through which the spindle also extends, as better shown in FIG. 5. The lower portion of rotary spindle 21 is suitably journalled in a non-rotative but vertically movable quill 26 suitably guided on machine frame 22. The quill 26 and motor housing 24 are suitably secured to a transversely disposed yoke 28 movable vertically by hydraulic actuators (not shown herein) but disclosed in U.S. Pat. No. 3,420,141 entitled "Positioner for a Member Such as a Machine Tool Spindle", to which cross-reference is hereby made to form part of this disclosure.

Spindle 21 is shown as being hollow or tubular to house a drawbar 29 forming part of a tool change mechanism including a tool holder 30 associated with its lower end, and shown in FIG. 3 as holding a mill cutter 31, for example. The upper end of spindle 21 is shown schematically in FIG. 3 as being formed so as to be adapted to engage with lock slides 32, 32 to hold the spindle in an elevated stationary position while an overhead drawbar mechanism 33 is adapted to shift the drawbar 29 longitudinally of the spindle so as to cause the tool holder 30 to release the cutting tool 31. Details of such a tool change mechanism are disclosed in U.S. Pat. No. 3,678,801 entitled "Quick Tool Change Mechanism for Machine Tools", to which cross-reference is hereby made to form part of this disclosure.

As further background, cross-reference is hereby made to U.S. Pat. No. 3,722,363 entitled "Automatic Tool Changer" which discloses a belt and pulley type spindle drive which is replaced by the hydraulic motor drive apparatus of the present invention. This U.S. Pat. No. 3,722,363 also shows means for indexing the spindle in a given angular position while a tool change is effected. This technique is also applied to the spindle drive of the present invention, being disclosed schematically by a notched disc 34 fast to the spindle and arranged immediately above motor housing cover 23 and cooperable with a spindle indexing latch 35. In FIG. 3, latch 35 is shown retracted in order to allow spindle 21 to rotate. Also spindle 21 is shown in FIG. 3 as being in a lowered, cutting tool operating position. When a tool change is desired the spindle must be raised by yoke 28 above the spindle position shown in FIG. 3, in order to cooperate with the lock slides 32 and drawbar mechanism 33.

Still referring to FIG. 3, a hydraulic manifold block 36 is shown suitably mounted on one side of motor housing 24. On this block, a single control valve means 38, preferably an electrohydraulic servovalve, is suitably mounted. While this servovalve may be of any suitable construction it is preferred that one having the construction disclosed in U.S. Pat. No. 3,023,782 entitled "Mechanical Feedback Flow Control Servo Valve" be employed.

In order to provide velocity feedback to such servovalve 38, as explained more fully later herein, means are provided for sensing the rotative speed of spindle 21. As shown in FIG. 3, such means comprises a tachometer 39 of any suitable construction mounted on motor housing 24 and having a driven pulley 40 connected by a belt 41 to a drive pulley 42 fast to spindle 21 and shown arranged immediately above disc 34. Tachometer 39 is arranged to generate a voltage proportional to the rotative speed of spindle 21. This voltage is conducted to a summing point 43, shown in FIG. 4, via a feedback conductor 44.

Multiple displacement hydraulic motor 20 is shown as including three hydraulic motive means or units L, M and H. Each is shown as being of the generated-rotor or gerotor type, which is preferred, although any other suitable type of positive displacement hydraulic motive means or unit may be employed. As previously mentioned, unit L has a low displacement; unit M has a medium displacement; and unit H has a high displacement.

Generated-rotor or gerotor type hydraulic motors are basically illustrated and explained on pages 56–58 of Herbert E. Merritt's book entitled "Hydraulic Control Systems", published in 1967 by John Wiley & Sons Inc., New York, to which cross-reference is hereby made to form part of this disclosure.

Generally speaking for present purposes, a hydraulic motor of the gerotor type comprises an internally toothed outer gear element and an externally toothed inner gear element which has one less tooth than the outer element. These toothed elements are mounted for rotation about fixed but eccentric axes. The teeth of these elements are formed so that each tooth of the inner element is always in sliding contact with a tooth of the outer element. As these elements rotate in the same direction at low relative speeds, with the inner element being faster, a given sealed chamber or pocket between the teeth of the inner and outer elements gradually increases in volumetric size through approximately 180° of each revolution until it reaches its maximum size, equivalent to the full volume of the missing tooth. During this initial half of the cycle, the gradually enlarging chamber is exposed to the inlet port and is filled with pressurized hydraulic drive fluid. During the subsequent 180° of the revolution, the chamber gradually decreases in size as the teeth mesh and the fluid is discharged through the outlet port. The volume of the missing tooth on the inner element multiplied by the number of teeth on such inner element determines the volume of fluid handled by the motor during each revolution, expressed as cubic displacement per revolution.

Figure 4:
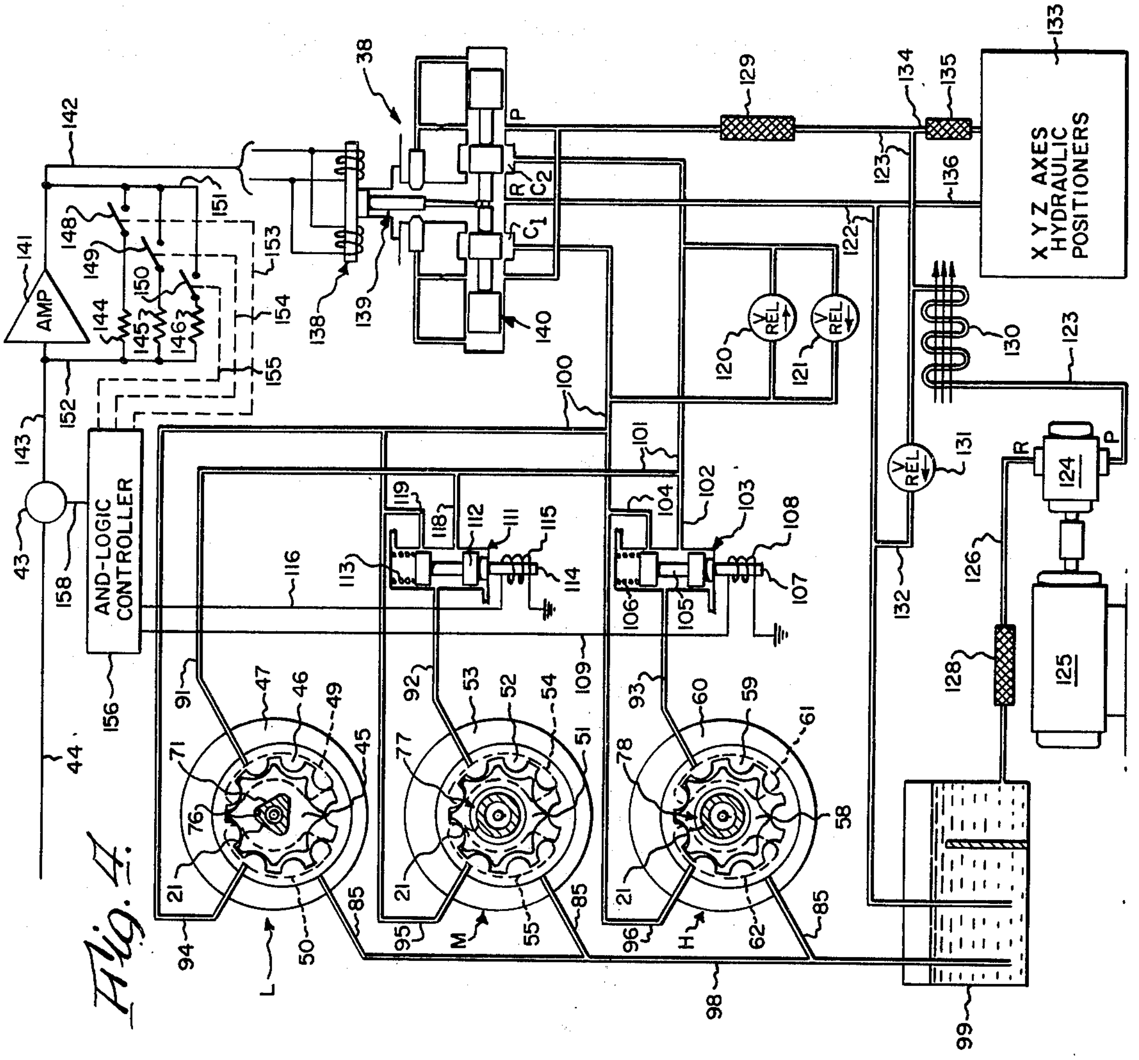
FIG. 4 is a schematic view of the hydraulic motive means of the multiple displacement hydraulic motor drive apparatus shown in FIG. 3, and illustrating the same separated and in operative association with other devices to provide a spindle drive which will deliver substantially constant horsepower to the spindle over a wide speed range.
Figure 5:
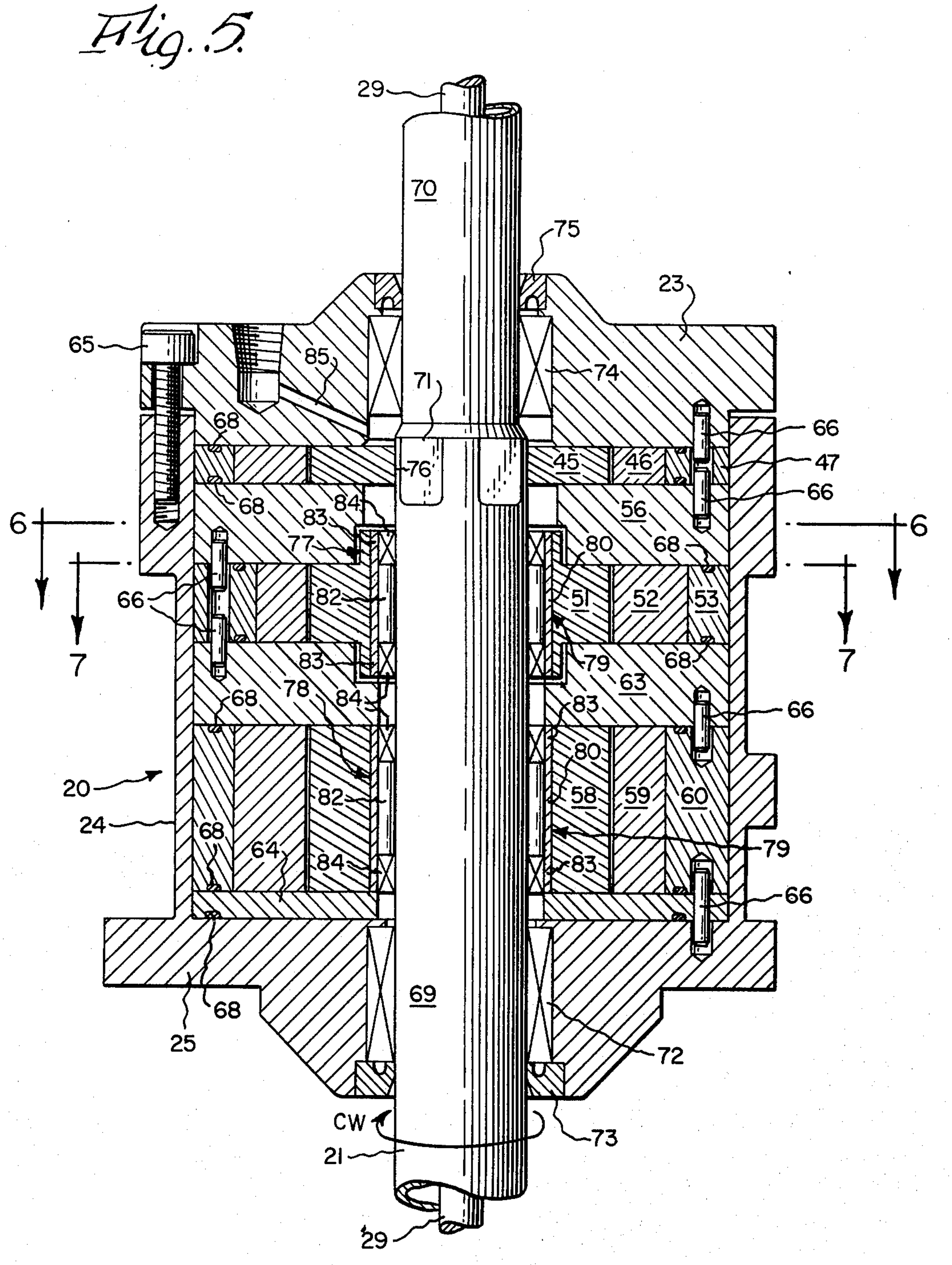
FIG. 5 is an enlarged vertical central sectional view of the multiple displacement hydraulic motor shown in FIG. 3.

Referring to FIGS. 4 and 5 particularly, motor unit L comprises an externally toothed inner gerotor element 45 surrounding and concentric with spindle 21, an internally toothed outer gerotor element 46 surrounding element 45 and maintained eccentric thereto by an eccentric ring 47 which is stationary and surrounds element 46 which rotates in the bore thereof. This low displacement gerotor set 45–47 is of uniform thickness, measured vertically as viewed in FIG. 5, thereby having coplanar flat upper surfaces and coplanar flat lower surfaces, is arranged in housing 24 and served by arcuate inlet and outlet manifold ports 49 and 50, respectively, provided in the flat underside of housing cover 23.

Similarly, motor unit M comprises an externally toothed inner gerotor element 51 surrounding and concentric with spindle 21, an externally toothed outer gerotor element 52 surrounding elements 51 and maintained eccentric thereto by a stationary surrounding eccentric ring 53 in the bore of which element 52 rotates. This medium displacement gerotor set 51–53 is of uniform thickness, measured vertically as viewed in FIG. 5, thereby having coplanar flat upper surfaces and coplanar flat lower surfaces, is arranged in housing 24 and served by arcuate inlet and outlet manifold ports 54 and 55, respectively, provided in the underside of a flat and parallel-sided overhead manifold plate 56. This plate 56 is sandwiched in between gerotor set 45–47 and gerotor set 51–53. It is to be noted that while the toothed elements of gerotor sets 45–47 and 51–53 have the same diameter, set 51–53 is thicker or has a larger dimension, measured vertically as viewed in FIG. 5. This increases the volume of the chambers or pockets between cooperating teeth to provide gerotor set 51–53 with a larger displacement than that for gerotor set 45–47.

Likewise, motor unit H comprises an externally toothed inner gerotor element 58 surrounding and concentric with spindle 21, an internally toothed outer gerotor element 59 surrounding element 58 and maintained eccentric thereto by a stationary surrounding eccentric ring 60 in the bore of which element 59 rotates. This high displacement gerotor set 58–60 is of uniform thickness, measured vertically as viewed in FIG. 5, thereby having coplanar flat upper surfaces and coplanar flat lower surfaces, is arranged in housing 24 and served by arcuate inlet and outlet manifold ports 61 and 62, respectively, provided in the underside of a flat and parallel-sided overhead manifold plate 63. This plate 63 is arranged between gerotor set 51–53 and gerotor set 58–60. This latter gerotor set also has the same diameter as the other gerotor sets but is still thicker or has a larger dimension, measured vertically as viewed in FIG. 5. This increases the volume of the chambers or pockets between cooperating teeth to provide gerotor set 58–60 with a still larger displacement than that for gerotor set 51–53.

Gerotor sets 45–47, 51–53, and 58–60 are commercially available as sets having the desired volumetric displacements per revolution, and correspond to the hereinabove mentioned low, medium and high displacement motive units L, M, and H, respectively.

Referring to FIG. 5, the various gerotor sets 45–27, 51–53, and 58–60 are stacked one upon another with the intervening manifold plates 56 and 63. This stack rests on a flat and parallel-sided bottom plate 64 arranged in cup-shaped motor housing 24 and is covered by housing cover and manifold plate 23. An annular series of circumferentially spaced fasteners such as machine screws 65 secure cover 23 to housing 24 and clamp the gerotor/manifold stack. The various adjacent stationary members, including housing cover 23, gerotor eccentric rings 47, 53 and 60, manifold plates 56 and 63, bottom plate 64 and housing lower end wall 25, are indexed for proper angular orientation by dowel pin and recess connections, severally indicated at 66. The upper and lower faces of the gerotor eccentric rings 47, 53, and 60 are shown as provided with annular grooves to accomodate O-ring seals, severally indicated at 68. These seal rings cooperate with the opposing flat surfaces which they contact.

Referring to FIG. 5, spindle 21 is shown as having a lower cylindrical portion 69 of slightly larger diameter than an upper concentric cylindrical portion 70 separated by an out-of-round or polygonal portion 71. An anti-friction bearing 72 of any suitable type journals spindle portion 69 on housing lower end wall 25, there being a shaft seal 73 of suitable construction at the outer or lower end of this bearing. An anti-friction bearing 74 of any suitable type journals spindle portion 70 on housing cover 23, there being a shaft seal 75 of suitable construction at the outer or upper end of this bearing.

For a purpose to be explained later herein, inner element 45 of the low displacement gerotor set 45–47 has a central through hole 76 of a polygonal shape complementary to and receiving spindle out-of-round portion 71 so as to non-rotatively connect this element 45 to the spindle.

There is shown operatively interposed between spindle portion 69 and inner element 51 of the medium displacement gerotor set 51–53 an overrunning clutch and bearing assembly 77 arranged for clutching effectiveness in the intended rotational direction. A similar overrunning clutch and bearing assembly 78 is shown as being operatively interposed between spindle portion 69 and inner element 58 of the high displacement gerotor set 58–60. Such assemblies 77 and 78 are commercially available and are illustrated and described, for example, in U.S. Pat. No. 3,194,368 entitled "Unitary Assembly of Overrunning Clutch and Bearing".

Typically, each such clutch and bearing assembly 77 or 78 includes an annular body member 79 which has a cylindrical exterior press-fitted or otherwise made fast to the wall of the cylindrical bore of the corresponding inner gerotor element 51 or 58. Centrally this clutch member 79 has a clutch portion 80 formed with internal cam faces, representatively shown at 81 in FIG. 7, which incline relative to the axis of member 79. Between each such cam face 81 and the cylindrical periphery of spindle portion 69 is a cylindrical clutch roller 82. At each end, body member 79 is formed as a raceway 83 for a series of rollers 84. These rollers 84 engage spindle portion 69 to carry the radial loads of the gerotor elements. The surface of the spindle portion 69 is hardened so that clutch rollers 82 on one side can engage the same directly and on the other side engage their respective wedge shaped cam faces 81.

Leakage past the gerotor faces toward the spindle shaft is drained via a case drain passage 85 provided in housing cover 23 to enable low pressure sealing of the shaft.

Figure 6:
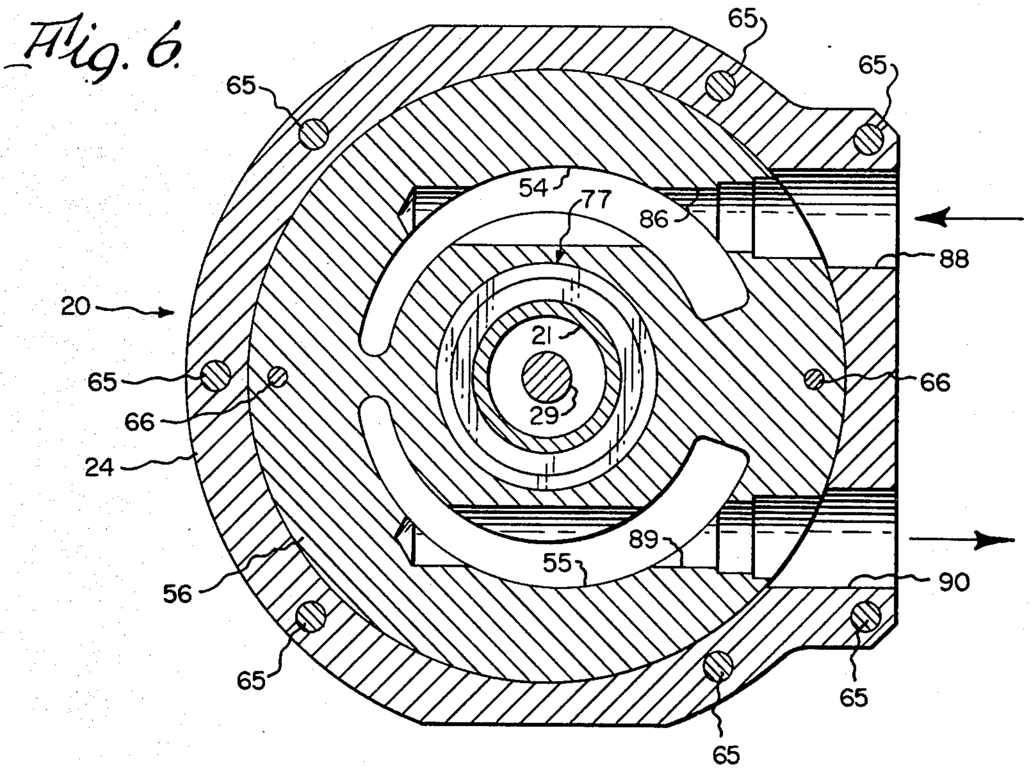
FIG. 6 is a horizontal transverse sectional view thereof taken on line 6—6 of FIG. 5.

Referring to FIG. 6, inlet manifold port 54 is shown as intercepted by a horizontal dead-ended inlet passage 86 provided in manifold plate 56 and leading to its exterior. An access hole 88 in housing 24 permits insertion of a hydraulic union (not shown) into the port formed by passageway 86. Similarly, outlet manifold port 55 is shown as intercepted by a horizontal dead-ended outlet passage 89 and leading to its exterior so as to communicate with an access hole 90 provided in the side wall of housing 24 and adapted to permit another hydraulic union (not shown) to be inserted therethrough and received in the port formed by passageway 89. Thus, the housing 24 is an unpressurized container.

In like manner, the combination housing cover-manifold plate 23, provided with inlet and outlet manifold ports 49 and 50, respectively, shown only in FIG. 4, are formed with intercepting dead-ended inlet and outlet passages which lead to inlet and outlet holes in housing 24. The same arrangement is provided for manifold plate 63 having inlet and outlet manifold ports 61 and 62, respectively, shown only in FIG. 4.

Thus, manifold block 36 (FIG. 3) has internal fluid handling passages suitably coupled to the housing inlet and outlet holes for the various manifold plates and associated gerotor units, typically illustrated in FIG. 6 by the inlet and outlet holes 88 and 90, respectively, for manifold plate 56 for gerotor unit M. These passages in block 36 are represented in FIG. 4. as inlet conduits 91, 92 and 93 for gerotor units L, M and H, respectively, and as outlet conduits 94, 95 and 96 for these gerotor units L, M and H, respectively. In FIG. 4, case drain passage 85 is shown individually for each gerotor unit L, M and H, and would return leakage via a return conduit 98 to a hydraulic fluid reservoir 99.

In FIG. 4, conduits 94-96 are shown manifolded to conduit 100 which leads to and communicates with one control port $C_1$ of electrohydraulic servovalve 38 which is schematically illustrated in this Figure. The other control port $C_2$ of this servovalve is shown in FIG. 4 as connected by conduit 101 with passage 91 and would be provided in block 36.

Still referring to FIG. 4, conduit 101 communicates via a branch conduit 102 with a normally open port of a solenoid valve 103 which also has a normally closed port communicating via conduit 104 with conduit 96. Passage 93 communicates with an always open port of this solenoid valve 103. This solenoid valve may be of any suitable construction. As illustrated, it includes a two-lobed valve slide 105, urged downwardly by a return spring 106, and an armature 107 surrounded by a coil 108. The end chambers above and below valve slide 105 are suitably connected to reservoir 99, the conduits for this purpose being only fragmentarily illustrated adjacent the solenoid valve in FIG. 4. Solenoid valve 103 is shown in a deenergized condition in which conduits 93 and 101 communicate with each other and conduit 104 is closed off by the upper lobe of valve slide 105. One end of coil 108 is shown grounded. When the other end of this coil is energized by passing a current through conductor 109, valve slide 103 will move upwardly against the urging of spring 106 to cause the lower lobe to block conduit 102 and to cause the upper lobe to unblock conduit 104 and establish communication between it and passage 93.

Similarly, a solenoid valve 111 is operatively associated with gerotor unit M. This solenoid valve is also illustrated as including a two-lobed valve slide 112, urged downwardly by a return spring 113, and an armature 114 surrounded by a coil 115 served by a conductor 116. The other end of this coil is shown grounded. Passage or conduit 92 communicates with the always open port of this solenoid valve 111. This valve also has a normally open port communicating via a branch conduit 118 with conduit 101, and further has a normally closed port communicating via a branch conduit 119 with conduit 95. The end chambers above and below valve slide 112 are suitably vented to reservoir 99, the conduits for this purpose being only fragmentarily illustrated adjacent the solenoid valve in FIG. 4. When coil 115 is energized by passing a current through conductor 116, valve slide 112 moves upwardly against the urging of spring 113 to cause the lower lobe to block off conduit 118 and to cause the upper lobe to unblock conduit 119 and establish communication between it and passage or conduit 92.

In the actual apparatus, solenoid valves 103 and 111 are preferably arranged within manifold block 36.

Oppositely acting cross port pressure relief valves 120 and 121 are shown as arranged across conduits 100 and 101 leading from servovalve control ports $C_1$ and $C_2$. These relief valves 120 and 121 prevent motor over-pressurization due to sudden deceleration of inertia loads.

Servovalve 38 has a pressure port P and a return port R. The latter is connected via return conduit 122 with reservoir 99. A supply conduit 123 connects pressure port P with the outlet of a pressure compensated variable volume pump 124 driven by an electric motor 125. The inlet of this pump is connected via conduit 126 with reservoir 99. A suitable filter 128 is shown arranged in inlet conduit 120. Conduit 123 is shown as having a suitable filter 129 therein and also having an air cooled coil section 130 therein. A pressure relief valve 131 in a conduit 132 connects supply conduit 123 downstream of cooler 130 with return conduit 122.

Such means for producing a supply of pressurized hydraulic drive fluid is also shown utilized to drive the hydraulic positioners for the X, Y and Z axes of the machine tool, such positioners being collectively indicated at 133 in FIG. 4. These can be of the type disclosed in U.S. Pat. No. 3,198,084, entitled "Positioner" for the X and Y axes, and in said U.S. Pat. No. 3,420,141 for the Z axis. A branch supply conduit 134 having a suitable filter 135 therein connects supply conduit 123 to positioners 133. A branch return conduit 136 connects return conduit 122 to positioners 133.

Since electrohydraulic servovalve 38 is fully disclosed as to construction and operation in said U.S. Pat. No. 3,023,782, it is deemed desirable to illustrate it schematically and to describe it only briefly in the present application. Such servovalve comprises a torque motor 138 including coils and an armature, a hydraulic amplifier 139 including a flapper interposed between a pair of fixed nozzles, and an output stage valve spool 140 slidably arranged in a valve body provided with the pressure port P, return port R, and control ports $C_1$ and $C_2$. An electric signal to the coils causes the armature-flapper member to pivot and produce a pressure differential upstream of the nozzles which is applied to the spool end chambers. This displaces the valve spool and meters flow through the control ports $C_1$ and $C_2$ and conduits 100 and 101 leading to the load.

Referring to FIG. 4, a servoamplifier 141 is shown as operatively associated by an output conductor 142 with the coils of the torque motor 139 of servovalve 38. This servo-amplifier has an input conductor 143 which is connected to summing point 43. The gain of the servoamplifier can be changed by selected resistors 144–146 in series with selectively operable switches 148–150, respectively, and these series circuits are connected across the servoamplifier by leads 151 and 152 connected to conductors 142 and 143, respectively. Control of switches 148–150 is represented by broken lines 153–155, respectively, leading from an and-logic controller 156.

This controller 156 may be of any suitable construction. In the application of the invention under consideration, the controller preferably includes a tape controlled command signal generator. The command signal is transmitted by a conductor 158 to summing point 43, there to be algebraically summed with any velocity feedback signal transmitted via conductor 44, to produce an error signal transmitted via conductor 143 to servoamplifier 141.

The actuation of switches 148–150 is controlled by suitable means within controller 156 to change the gain of the servoamplifier 141 as required to set the servoloop gain within stable limits for each motor displacement combination.

The energization of solenoid valves 103 and 111 is also controlled by suitable means within controller 156 to supply current to conductors 109 and 116 so as to block or unblock the connection of the gerotor units M and H to a supply of pressurized hydraulic drive fluid at pre-selected shaft speeds.

OPERATION

Hydraulic pump 124 provides a supply of hydraulic drive fluid under pressure which, typically, may be 1500 psi. The hydraulic supply is utilized to drive the actuators of the X, Y and Z positioners 133. It is also utilized to supply the single servovalve 38 which controls the flow of fluid in control port lines 100 and 101 in proportionate response to an error signal conducted to it via conductor 142. This error signal results from the algebraic sum of any tape controlled command signal from controller 156 via conductor 158 and any velocity feedback signal from tachometer 39 via conductor 44. Controller 156 suitably regulates the actuation of switches 148–150 to provide the loop gain desired.

Controller 156 also regulates the energization of solenoid valves 103 and 111 to block hydraulic supply to either or both of gerotor units M and H, as desired.

It is to be noted that low displacement gerotor unit L at all times is connected to the hydraulic supply. Medium displacement gerotor unit M is connected to the hydraulic supply only when solenoid valve 111 is deenergized. Likewise, high displacement gerotor unit H is connected to the hydraulic supply only when solenoid valve 103 is deenergized.

Assuming high torque and low speed of the spindle 21 is desired, a speed in the range $R_L$ depicted in FIG. 2, the net displacement of hydraulic motor 20 is then the sum of the displacements of gerotor units L, M and H. The horsepower delivered to the spindle in relation to the low speed range $R_L$ will follow the curve portion 15 shown in FIG. 2.

If a higher spindle speed is desired, when the speed passes the high speed end of range $R_L$ and enters medium speed range $R_M$, controller 156 is operative to make a predetermined actuation of one or more switches 148–150 to adjust the servoloop gain, and also is operative to energize solenoid valve 103. This blocks the supply of hydraulic drive fluid to high displacement gerotor unit H, leaving hydraulic motor 20 with a net displacement resulting from the sum of the displacements of the low and medium displacement gerotor units L and M. Performance of hydraulic motor 20 now follows curve portion 16 in FIG. 2.

If still a higher spindle speed is desired, when the speed passes the high speed end of range $R_M$ and enters high speed range $R_H$, controller 156 makes a predetermined adjustment in the loop gain by suitably actuating switches 148–150, and also energizes both solenoid valves 103 and 111. This blocks the supply of hydraulic drive fluid to both high and medium displacement gerotor units H and M, leaving hydraulic motor 20 with a net displacement resulting only from the displacement of the low displacement gerotor unit L. Performance of hydraulic motor 20 now follows curve portion 17 in FIG. 2.

With the described multiple displacement hydraulic motor, other combinations of the gerotor units L, M and H are possible, such as the combination of L plus H, to smooth out the saw tooth pattern of the available load power curve.

The opposite procedure is followed in unblocking the gerotor units M and H as spindle speed is lowered in passing through the ends of the speed range $R_M$ so as to shift net displacement of motor 20.

Because of the generally saw tooth configuration of the crests of the curve portions 15, 16 and 17, it will be seen that varying the net displacement of the hydraulic motor 20 in a predetermined manner related to its output shaft speed results in a multiple displacement hydraulic motor which provides a means of providing essentially constant horsepower over a wide speed range.

By using gerotor elements, or similar hydraulic motive means, and small overrunning clutches, a simple and compact hydraulic motor drive device can be provided. The drive displacement, and hence torque capability, is varied by blocking flow to one or more of the multiple displacement motive units. When all units are required, the control flow regulated by the single servovalve is divided among the number of units in use in proportion to the unit displacement. The engaged clutches provide load sharing at the shaft. During multiple engagement, any motive unit momentarily not engaged will be unloaded and hence tend to overspeed, causing engagement of the overrunning clutch.

Figure 7:
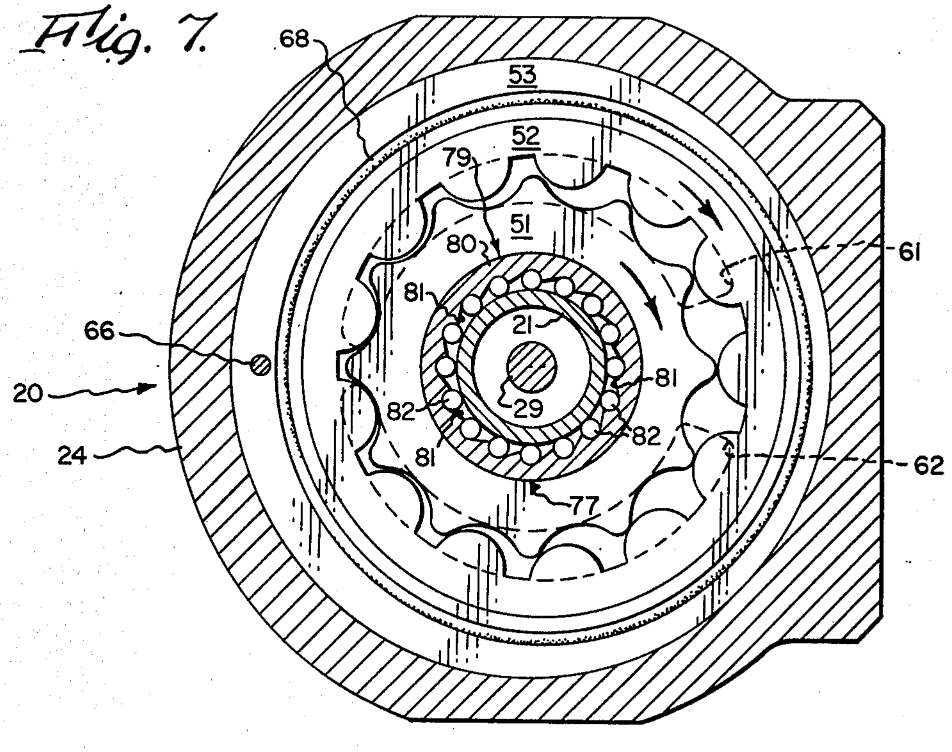
FIG. 7 is another horizontal transverse sectional view thereof taken on line 7—7 of FIG. 5.

The nature of the overrunning clutch results in a drive which is unidirectional, clockwise as viewed in FIG. 7, because this is the usual hand or direction of rotation of metal cutting tools. A reversing capability is provided by the permanent coupling between the gerotor unit L and the spindle 21, due to the out-of-round connection 71,76, and a bypass function in the blocking solenoid valves used to select displacement to allow gerotor bypass pumping through conduits 104 and 119.

In the illustrative application of the invention herein disclosed, the unidirectional power capability is consistent with most spindle requirements since machine tool cutting elements, such as drills, end mills and so on, are generally right handed, i.e. clockwise as viewed from above. Reverse speeds, when required, are accomplished with low power demand, such as for tap extraction.

Inasmuch as changes in the illustrative embodiment disclosed, or other embodiments of the invention, may occur to those skilled in the art without departing from the spirit of the invention, the scope of the invention is to be determined by the appended claims.

What is claimed is:

1. Variable speed drive apparatus for a shaft, comprising a first constant displacement rotary hydraulic motor drivingly associated with said shaft, at least one additional constant displacement rotary hydraulic motor drivingly associated with said shaft, overrunning clutch means operatively interposed between each such additional motor and said shaft, and single valve means arranged to meter the flow of hydraulic drive fluid to said motors to control their speed.

2. Apparatus according to claim 1, which further comprises a blocking valve associated with each such additional motor and operative to communicatively connect such motor to said single valve means below a predetermined rotative speed of said shaft but operative to block such connection above said predetermined speed.

3. Apparatus according to claim 2, wherein said single valve means is an electrohydraulic servovalve, and which further comprises a tachometer arranged to generate an electrical signal responsive to the rotative speed of said shaft and to deliver said signal to said servovalve as a velocity feedback.

4. Apparatus according to claim 3, which further comprises means arranged to change the servoloop gain in relation to operation of each such blocking valve.

5. Variable speed drive apparatus for a shaft, comprising a plurality of constant displacement rotary hydraulic motors drivingly associated with said shaft, a first of said motors having a relatively high constant displacement, a second of said motors having a relatively lower constant displacement and a third of said motors having a relatively lowest constant displacement, single valve means arranged to meter the flow of hydraulic drive fluid to said motors to control their speed, a first blocking valve associated with said first motor, and a second blocking valve associated with said second motor, each of said first and second blocking valves being operative to communicatively connect its corresponding one of said first and second motors to said single valve means during a low range of rotative speed of said shaft, but only said second blocking valve being so operative during an intermediate speed range, and neither of said blocking valves being so operative during a high speed range.

* * * * *